Patented Oct. 26, 1954

2,692,897

UNITED STATES PATENT OFFICE 2,692,897

PROCESS FOR THE PRODUCTION OF ACYLAMIDO DIOL COMPOUNDS

George W. Moersch, Detroit, Mich., assignor to Parke, Davis & Company, Detroit, Mich., a corporation of Michigan No Drawing. Application March 1, 1952,
Serial No. 274,501

6 Claims. (Cl. 260—562)

This invention relates to a process for the production of acylamido diol compounds. More particularly, the invention relates to a process for the production of 1-phenyl-2-dichloroacetamidopropane-1,3-diol compounds having the formula,

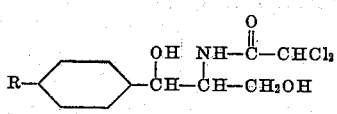

where R is a hydrogen, halogen, nitro, lower alkoxy or phenyl substituent.

It will be appreciated by those skilled in the art that the above compounds as well as the starting materials used in their production can exist in structural or diastereoisomeric as well as optical isomeric forms. The diastereoisomeric forms are herein referred to as the "threo" (pseudo) and the "erythro" (regular) forms, respectively. Each of these diastereoisomers can exist as racemates of optically active isomers thus giving a total of six different forms. Because of the difficulty of representing these different forms in graphic formulae, the customary structural formulae will be used both in the specification and claims and a notation placed below or to the side of the formula to designate the particular structural and optical configuration of the compound. Where the formula represents the unresolved mixture of structural and optical isomers the notation "unresolved" will be used. However, it should be expressly understood that where no notation appears with a structural formula the formula is to be interpreted in its generic sense, that is, as representing the D-threo, L-threo, D-erythro or L-erythro isomers in separated form as well as the DL-threo or DL-erythro optical racemates or the total unresolved mixture of structural and optical isomers. Such a formula does not merely represent the unresolved mixture of isomers.

In accordance with the invention 1-phenyl-2-dichloroacetamidopropane-1,3-diol compounds having the above formula are produced by reacting dichloroacetonitrile with an amino diol compound of formula,

in an aqueous reaction medium; where R has the same significance as given above. As a reaction medium water alone can be used, but the low water solubility of both the starting materials and final products makes it preferable to employ an aqueous solution of a water-miscible organic solvent as the reaction medium. Some examples of suitable solvents for the process are aqueous methanol, aqueous ethanol, aqueous acetone, aqueous isopropanol, aqueous dioxane and the like.

The process can be carried out at a temperature of below about 100° C. and preferably in the range of 20 to 65° C. Best results are obtained when using a temperature in the neighborhood of 20 to 30° C. because at this temperature practically no thermal decomposition of the amino diol starting material takes place. At the higher temperature (about 70° C.) the reaction mixture tends to become very dark-colored, thus lowering the yield and making it more difficult to isolate the reaction product.

The process appears to involve the formation of an intermediate product composed of a mixture of oxazolines which simultaneously undergoes partial hydrolysis to the desired 1-phenyl-2-dichloroacetamidopropane-1,3-diol compound as shown in the following diagram:

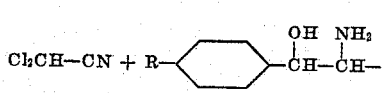 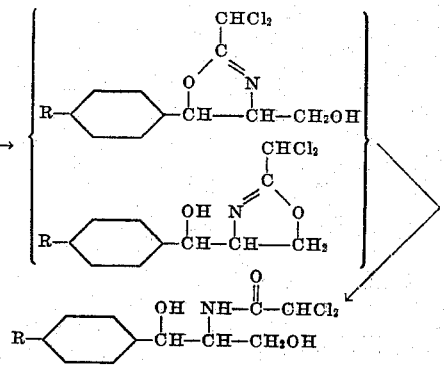

where R has the same significance as given above. In order to insure satisfactory yields of the desired products it is, therefore, necessary to continue the reaction until the partial hydrolysis of the intermediate product is substantially complete. In general, this usually requires at least four days at a reaction temperature of 20 to 35° C., about forty-eight hours at 50° C. and about eight hours at 75° C.

The relative quantities of the reactants is not particularly critical, but in practice an excess of the cheaper and more readily available dichloroacetonitrile is usually employed. Similarly, the amount of water present in the reaction medium is not very critical but, in general, at least 10% by weight with respect to the amino diol compound is employed.

The products produced by the process of the invention are useful as therapeutic agents per se or as intermediates in the production of other organic compounds possessing valuable therapeutic properties.

The invention is illustrated by the following examples.

Example 1

A mixture consisting of 2.12 g. of D-(—)-threo-1-p-nitrophenyl-2-aminopropane-1,3-diol, 1 cc. of dichloroacetonitrile and 25 cc. of a 1 to 1 methanol-water mixture is stirred at room temperature (about 25° C.) for five days. The reaction mixture is filtered to obtain 1.45 g. of a product melting at 142° C. On concentration of the filtrate an additional 0.8 g. of the product melting at 140–2° C. is obtained. The 2.25 g. of material so obtained is recrystallized from methanol-ethylene dichloride mixture and again from methanol to obtain 1.4 g. of the desired D-(—)-threo-1-p-nitrophenyl - 2 - dichloroacetamidopropane - 1,3-diol; M. P. 149–50° C. (33% yield), and a second crop of 0.3 g. crystalline material melting at 123–4° C. Recrystallization from methanol of the second crop of crystals yielded pure D-(—)-threo - 2 - dichloromethyl - 4 - hydroxymethyl-5-p-nitrophenyl-Δ²-oxazoline, a by-product of the process.

Example 2

A mixture consisting of 10.6 g. of DL-threo-1-p-nitrophenyl-2-aminopropane-1,3-diol, 5 cc. of dichloroacetonitrile and 125 cc. of a 1 to 1 methanol-water mixture is stirred at 30° C. for five days. The reaction mixture is cooled, filtered and the crystalline DL-threo-1-p-nitrophenyl-2-dichloroacetamidopropane-1,3-diol purified by recrystallization from methanol or water; M. P. 150° C.; yield 41%.

Example 3

A mixture consisting of 10.6 g. of DL-erythro-1-p-nitrophenyl-2-aminopropane-1,3-diol, 5 cc. of dichloroacetonitrile and 125 cc. of a 1 to 1 methanol-water mixture is stirred at room temperature (25° C.) for six days. The crystalline reaction product is collected and recrystallized from methanol to obtain the desired DL-erythro-1-p-nitrophenyl - 2 - dichloroacetamidopropane - 1,3-diol in pure form; M. P. 172–3° C.; yield 38%.

Example 4

A mixture consisting of 16.6 g. of DL-erythro-1-phenyl-2-aminopropane-1,3-diol, 10 cc. of dichloroacetonitrile and 100 cc. of a 1 to 1 ethanol-water mixture is heated and stirred at 50° C. for sixty hours. The reaction mixture is evaporated to a small volume in vacuo, cooled and the crystalline product collected. Recrystallization from water yields the desired DL-erythro-1-phenyl-2-dichloroacetamidopropane-1,3-diol; M. P. 158–9° C.; yield 45%.

Example 5

A mixture consisting of 12.2 g. of DL-threo-1-(4′-biphenylyl)-2-aminopropane-1,3-diol, 5 cc. of dichloroacetonitrile and 100 cc. of a 1 to 1 methanol-water mixture is stirred at 25° C. for six days. The crystalline reaction product is collected and recrystallized from water to obtain the desired DL - threo - 1 - (4′ - biphenylyl) - 2 - dichloroacetamidopropane-1,3-diol; M. P. 149–50° C.

What I claim is:

1. Process for the production of a 1-phenyl-2-dichloroacetamidopropane - 1,3 - diol compound having the formula,

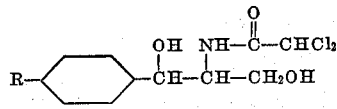

which comprises reacting dichloroacetonitrile with an amino diol compound of formula,

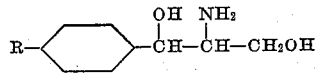

in an aqueous reaction medium at a temperature between 20° and 60° C. until the intermediate product so produced has for the most part undergone partial hydrolysis to the said 1-phenyl-2-dichloroacetamidopropane - 1,3 - diol compound; where R is a member of the class consisting of hydrogen, halogen, nitro, lower alkoxy and phenyl radicals.

2. Process for the production of a 1-phenyl-2-dichloroacetamidopropane - 1,3 - diol compound having the formula,

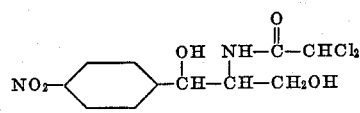

which comprises reacting dichloroacetonitrile with an amino diol compound of formula,

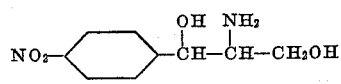

in an aqueous reaction medium at a temperature between 20° and 65° C. for a time greater than 8 hours until the intermediate product so produced has for the most part undergone partial hydrolysis to the said 1-phenyl-2-dichloroacetamidopropane-1,3-diol compound.

3. Process for the production of D-(—)-threo-1 - p - nitrophenyl - 2 - dichloroacetamidopropane-1,3-diol which comprises reacting dichloroacetonitrile with D-(—)-threo-1-p-nitrophenyl-2-aminopropane-1,3-diol in an aqueous reaction medium at a temperature of 20 to 35° C. for at least four days.

4. Process for the production of DL-threo-1-p-nitrophenyl - 2 - dichloroacetamidopropane - 1,3-diol which comprises reacting dichloroacetonitrile with DL-threo-1-p-nitrophenyl-2-aminopropane-1,3-diol in an aqueous reaction medium at a temperature of 20 to 35° C. for at least four days.

5. Process for the production of DL-erythro-1- p-nitrophenyl-2-dichloroacetamidopropane-1,3-diol which comprises reacting dichloroacetonitrile with DL-erythro-1-p-nitrophenyl-2-aminopropane-1,3-diol in an aqueous reaction medium at a temperature of 20 to 35° C. for at least four days.

6. Process which comprises mixing dichloroacetonitrile and 1-p-nitrophenyl-2-aminopropane-1,3-diol in aqueous methanol at a temperature between 20° and 65° C. for a time greater than 8 hours thereby precipitating from the reaction mixture a crystalline p-nitrophenyl-2-dichloroacetamidopropane-1,3-diol.

References Cited in the file of this patent

UNITED STATES PATENTS

| Number | Name | Date |
|---|---|---|
| 2,402,198 | Loder | June 18, 1946 |
| 2,513,346 | Moersch et al. | July 4, 1950 |

FOREIGN PATENTS

| Number | Country | Date |
|---|---|---|
| 275,968 | Switzerland | Oct. 1, 1951 |

OTHER REFERENCES

Chemical Reviews, vol. 44, June 1949, pp. 457 to 459.